United States Patent [19]

Itou et al.

[11] Patent Number: 4,977,347

[45] Date of Patent: Dec. 11, 1990

[54] COLOR FILTER AND CATHODE-RAY TUBE USING THE COLOR FILTER

[75] Inventors: Takeo Itou, Kumagaya; Hidemi Matsuda, Oomiya, both of Japan

[73] Assignee: Kabushiki Kaisha Toshiba, Kawasaki, Japan

[21] Appl. No.: 389,680

[22] Filed: Aug. 4, 1989

[30] Foreign Application Priority Data

Aug. 8, 1988 [JP] Japan ................................ 63-196091

[51] Int. Cl.[5] .......................... H01J 29/89; G02B 5/22

[52] U.S. Cl. .................................... 313/478; 313/112; 350/311; 358/253

[58] Field of Search ................ 313/478, 112; 350/311; 358/253

[56] References Cited

U.S. PATENT DOCUMENTS 3,143,683 8/1964 Duncan et al. ................. 313/112 X
3,474,039 10/1969 Newing .
4,617,490 10/1986 Fitzpatrick et al. ................ 313/478
4,694,218 9/1987 Chao .................................. 313/478
4,776,671 10/1988 Sumi et al. .......................... 350/311
4,929,865 5/1990 Blum .................................. 313/478

FOREIGN PATENT DOCUMENTS 58-17134 4/1983 Japan .
61-16452 1/1986 Japan .

*Primary Examiner*—Palmer C. DeMeo
*Attorney, Agent, or Firm*—Cushman, Darby & Cushman

[57] ABSTRACT

A color filter comprising a vitreous material including at least one kind of organic compound having visible light absorbing properties, and at least one metallic compound selected from the group consisting of a Ni compound and a Co compound. A given dye can be used in the color filter of this invention as the organic compound. Thus, the hue of the color filter is freely selectable. In addition, high light resistance can be attained by sealing the organic compound in the vitreous material in the presence of the metal compound.

18 Claims, 2 Drawing Sheets

COLOR FILTER AND CATHODE-RAY TUBE USING THE COLOR FILTER

BACKGROUND OF THE INVENTION

1. Field of the Invention

The present invention relates to a color filter and a cathode-ray tube using the color filter.

2. Description of the Related Art

As examples of a color filter having an inorganic substrate, there are known a color filter having a color layer obtained by diffusing metallic ions in a glass plate, and a color filter formed by printing a dye on a glass plate. In the case of the former, however, the hue of the color filter cannot be freely selected because of the use of metal ions. Also, in the case of the latter, it is difficult to effect printing on the surface of an inorganic substrate.

Japanese Patent Publication No. 58-17134 discloses a method wherein an aluminum layer is deposited on an inorganic substrate, the aluminum layer is oxidized to obtain a transparent aluminum oxide layer, and the aluminum oxide layer is colored with a dye or the like, thus forming a color layer. In this method, an expensive deposition apparatus is required for the deposition of aluminum. Thus, the cost for manufacturing the color layer increases. The deposition device becomes more expensive, as the size of the substrate, on which aluminum is to be deposited, increases. In addition, since the refractive index of aluminum oxide is high, the formation of an aluminum oxide layer on the surface of a glass plate, etc., increases the reflectivity of the resulting body and the transparency of the body decreases. Furthermore, since the light resistance of the color layer colored with a dye is low, the color of the dye on the surface of the aluminum oxide layer may be faded by direct irradiation of solar light.

SUMMARY OF THE INVENTION

An object of the present invention is to provide a color filter which has high light resistance, and allows easy formation, and in which a hue can be freely selected.

Another object of this invention is to provide a cathode-ray tube having, on its faceplate, a color filter having a selectable hue, having high light resistance, and allowing easy formation.

The color filter of the present invention comprises a vitreous material including at least one kind of organic compound having visible light absorbing properties, and at least one metallic compound selected from the group consisting of a Ni compound and a Co compound.

A given dye can be used in the color filter of this invention as an organic compound having visible light absorbing properties. Thus, the hue of the color filter is freely selectable.

According to the present invention, high light resistance can be attained by sealing a dye in the vitreous material in the presence of at least one metal compound selected from the group consisting of a Ni compound and a Co compound.

The cathode-ray tube of the present invention has the color filter on its faceplate. In this invention, the hue of the faceplate can be freely selected by choosing a given dye as the organic compound. In addition, the color filter of the cathode-ray tube has high light resistance.

The color filter of the present invention is applicable not only to the cathode-ray tube, but also to sunglasses, show windows, windshields of vehicles, etc.

DETAILED DESCRIPTION OF THE PREFERRED EMBODIMENTS

Figure 1:
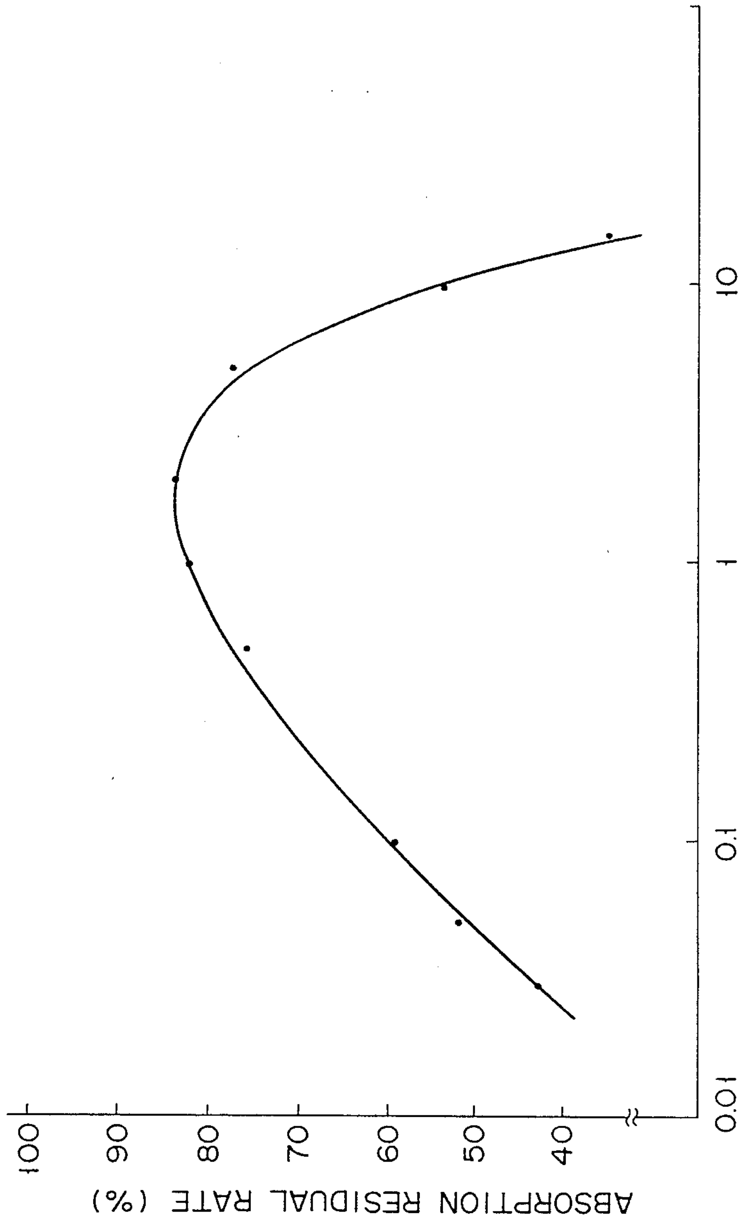
FIG. 1 is a graph showing the relationship between a weight ratio of the Ni compound content to the organic compound content, and an absorption residual rate of an absorption peak after irradiation of ultraviolet rays, in a color filter according to Example 1 of the present invention.

The inventors examined the effects of additives acting on the light resistance of a dye contained in a glass material. For this purpose, they sealed various additives along with the dye in a vitreous film, and the light resistance of the dye was examined. More specifically, a commercially available ultraviolet absorbent, antioxidant, and metallic compound were used as additives, Rhodamine B (manufactured by Kanto-Kagaku Kabushiki-Kaisha) was used as a dye, and a metal halide lamp was used as a light source. Thus, a peak absorption residual rate of ultraviolet rays in the dye was found, after 4-hour irradiation of ultraviolet rays under the condition of 100 $mW/cm^2$. The absorption residual rate (D) is given by:

$$D = \frac{(1 - T4)}{(1 - T0)} \times 100\ (\%) \qquad (1)$$

T0: Initial Main Peak Transmittance
T4: Main Peak Transmittance obtainable after 4 hours The results are shown in Table 1.

TABLE 1

| ADDITIVE | ABSORPTION RESIDUAL RATE ($100\ mW/cm^2 \times 4$ hours) |
|---|---|
| ABSENT | 9% |
| TINUVIN P | 11% |
| TINUVIN 144 | 9% |
| TINUVIN 320 | 12% |
| TINUVIN 328 | 11% |
| IRGANOX 565 | 12% |
| IRGANOX 1010 | 10% |
| $Cr(NO_3)_3 \cdot 9H_2O$ | 8% |
| $Mn(NO_3)_2 \cdot nH_2O$ ($n = 4 \sim 6$) | 12% |
| $Fe(NO_3)_3 \cdot 9H_2O$ | 5% |
| $Co(NO_3)_2 \cdot 9H_2O$ | 75% |
| $Ni(NO_3)_2 \cdot 6H_2O$ | 82% |
| $Pd(NO_3)_2$ | 16% |
| $AgNO_3$ | 14% |
| $SnCl_4 \cdot nH_2O$ | 10% |
| $CeCl_3 \cdot 7H_2O$ | 3% |

As seen from Table 1, the antioxidant and ultraviolet absorbent, which are effectively used in plastics or resin, did not exhibit effects of preventing deterioration in light resistance of the dye. In contrast, the Ni compound and Co compound exhibit remarkable effects of preventing deterioration in light resistance.

Regarding the Ni compounds and Co compounds, similar effects were obtained from compounds shown in Table 2.

TABLE 2

| ADDITIVE | ABSORPTION RESIDUAL RATE ($100\ mW/cm^2 \times 4$ hours) |
|---|---|
| $4H_2O$, Nickelbis(octylphengl)sulfide | 85% |
| [2,2'-thiobis(4-t-octylphenolate)] -n-butylaminnickel | 90% |
| Nickel complex-3, 5-di-t-butyl-4-hydroxybenzylphosphormonoethylate | 83% |
| Nickeldibutyldithionacarbamate | 87% |
| bis(dithiobenzyl)nickel complex | 89% |
| cobalt chloride | 70% |

It is not clear why excellent effects can be obtained only in the case of the Ni compound and the Co compound. It seems that this is a phenomenon peculiar to the Ni compound or Co compound in the case where an organic compound such as a dye is sealed in the vitreous film. It is likely that the Ni compound or the Co compound form a complex with an organic compound having visible light absorbing properties in a vitreous material such as an $SiO_2$ structure, thereby to prevent a radical reaction of an organic compound due to irradiation of ultraviolet, etc.

The color filter of the present invention is made of a vitreous material including at least one kind of organic compound having visible light absorbing properties, and at least one selected from the group consisting of Ni compounds and Co compounds.

As the organic compound, a dye, a near ultraviolet radiation absorbent a near infrared radiation absorbent, etc. may be used. The hue of the dye can be freely selected. For example, the following may be used:

Rhodamine B, Acid Rhodamine B, Kayaset Blue 5P, Kayaset Cyan 2P, Kayanol Mealing Red 68W, Kayaset Red 14P, Kayaset Magenta IP, Kayaset Red SFB, IR 750, Kayaset IRG 002, Kayaset IRG 003, Kayaset IRG 820, Kayaset IRG 022, Kayaset IRG 023, Kayaset CY 2, Kayaset CY 4, Kayaset CY 9 (manufactured by NIHON KAYAKU Kabushiki Kaisha), Aizen Spilon S.P.T. Blue 111, Aizen Spilon Blue C-RH, Aizen Spilon Violet C-RH, Aizen Spilon Green C-GH, Aizen Spilon Red C-GH, Aizen Spilon Red C-BH, Aizen Spot Yellow-1, Aizen Spot Orange-1, Aizen Spot Red-1, Aizen Spot Pink-1, Aizen Spot Blue 1, Aizen Spot Violet-1, Aizen Spot Green-3, Aizen Spot Black-1 (manufactured by HODOGAYA KAGAKU KOUGYOU Kabushiki Kaisha).

The content of the organic compound varies depending on the kind of the organic compound used. Normally, 0.03 to 50% of the organic compound is used based on the weight of the entire color filter.

As the Ni compound, the following, for example, may be used:

$Ni(NO_3)_2.6H_2O$, $NiCl_2.6H_2O$, $NiF_2$, $NiBr_2$, $NiI_2$, $NiSO_4$, $Ni(CH_3COO)_2.4H_2O$, nickelbis(octylphenyl)sulfide, [2,2'-thiobis(4-t-octylphenolate)]-n-butylaminnickel, nickel complex-3, 5-di-t-butyl-4-hydroxybenzylphosphomonoethylate, nickeldibutyldithionacarbamate, bis(dithiobenzyl)-nickel complex, etc.

In addition, as the Co compound, the following, for example, may be used: $CoCl_2$, $CoF_2$, $CoBR_2$, $CoI_2$, $CoSO_4$, $Co(CH_3COO)_2.4H_2O$, $CoNO_3.6H_2O$, etc.

The weight ratio of added Ni compound or Co compound to the organic compound is 0.05 to 10, and preferably 0.2 to 6. There is a tendency that, if the weight ratio is smaller than 0.05, a sufficient light resistance is not obtained, and if the weight ratio is larger than 10, the transparency and strength of the color filter may be degraded.

It is desirable that the vitreous material be formed by an alcoholate method. In the alcoholate method, an alcohol solution of an alcoholate, for example, $Si(OCH_3)$, represented by the general formula (2):

M(OR)m (where M = metal, R = alkyl group having the number of carbon atoms of 1 to 4, and m = valence of M) . . . (2)

is subjected to a hydrolysis and a condensation reaction with an acid catalyst or the like, thus obtaining an O—Si—O bond. Normally, $SiO_2$ glass is manufactured in a melting process at a temperature of 1500° to 2300° C. If this method is used, the O—Si—O bond can be obtained at a low temperature range of about 80° to 150° C. It is thus possible to mix a dye or the like, which is susceptible to thermal fading, in the resulting vitreous material.

As the alcoholate, the following, for example, may be used: $Si(OCH_3)_4$, $Si(OC_2H_5)_4$, $Si(OC_3H_7)_4$, $Si(OC_4H_9)_4$, $Zr(OCH_3)_4$, $Zr(OC_2H_5)_4$, $Zr(OC_3H_7)_4$, $Zr(OC_4H_9)_4$, $Ti(OCH_3)_4$, $Ti(OC_2H_5)_4$, $Ti(OC_3H_7)_4$, $Ti(OC_4H_9)_4$, etc.

As the acid catalyst, hydrochloric acid, nitric acid, acetic acid, sulphuric acid, various organic acids, etc., may be used.

EXAMPLE 1

Solutions A1 to A9 having the following compositions were prepared.

| | |
|---|---|
| tetramethoxysilane | 2 wt % |
| hydrochloric acid | 1 wt % |
| rhodamine B | 0.2 wt % |
| Ni $(NO_3)_2 \cdot 6H_2$ | 0.005 to 3 wt % |
| isopropyl alcohol | balance |

The amounts of the Ni compounds used in solutions A1 to A9 are 0.005 wt %, 0.01 wt %, 0.02 wt %, 0.1 wt %, 0.2 wt %, 0.4 wt %, 1.0 wt %, 2.0 wt %, and 3.0 wt %, respectively. In other words, the weight ratio of Ni compounds to the organic compound is 0.025 to 15. Solutions A1 to A9 were aged for 3 hours at room temperature to proceed a hydrolysis and a condensation reaction in the solutions to some extent, then the solutions were coated on a glass plate by a dipping method, and dried at 100° C. for 10 minutes. Thus, a red color filter containing $SiO_2$ as a main component was obtained. Based on formula (1) described above, a peak absorption residual rate of ultraviolet rays was found, by measuring the absorption peak (initial main peak) transmittance of the obtained color filter, and the absorption main peak transmittance (obtained after 4-hour radiation of ultraviolet rays).

FIG. 1 is a graph showing the relationship between a weight ratio of the Ni compound content to the organic compound content, and the absorption residual rate of ultraviolet rays.

As seen from FIG. 1, the color filter had an excellent absorption residual rate. Also, it was found that a desirable weight ratio of the Ni compound to the organic compound, for example, a dye, was 0.005 to 10, and preferably 0.2 to 6.

EXAMPLE 2

Solutions B1 to B6 having the following compositions were prepared.

| | |
|---|---|
| $Si(OC_2H_5)_4$ | 0.15 wt % |
| $Zr(OC_4H_9)_4$ | 0.27 to 1.61 wt % |
| hydrochloric acid | 1 wt % |
| water | 6 wt % |
| rhodamine B | 0.2 wt % |
| isopropyl alcohol | balance |

Figure 2:
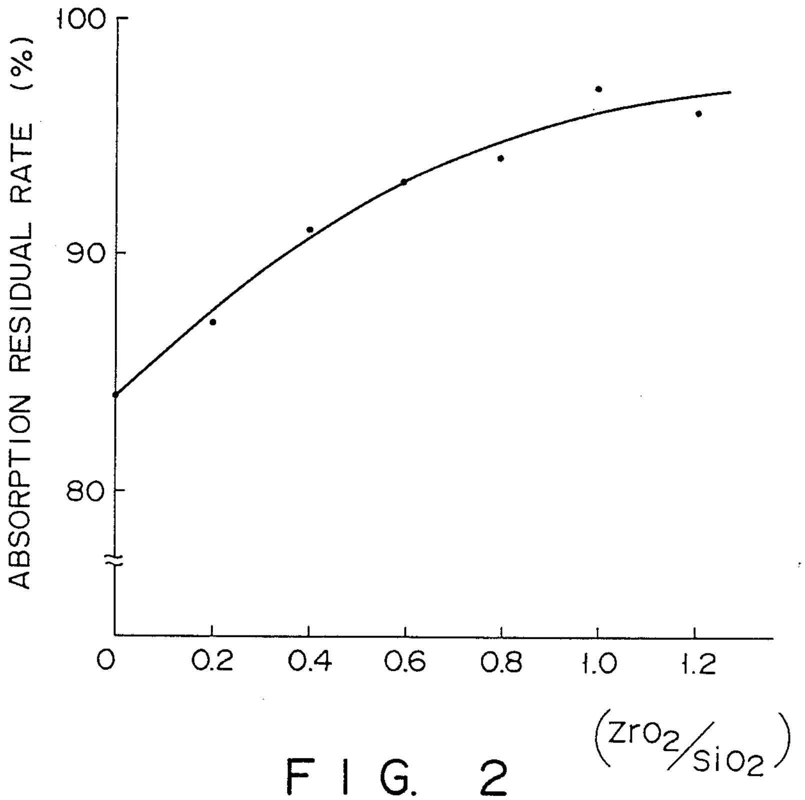
FIG. 2 is a graph showing the relationship between a weight ratio of the $ZrO_2$ content to the $SiO_2$ content, and an absorption residual rate of an absorption peak after irradiation of ultraviolet rays, in a color filter according to Example 2 of the present invention.

The amounts of the $Zr(OC_4H_9)_4$ added in solutions B1 to B6 are 0.27 wt %, 0.54 wt %, 0.81 wt %, 1.34 wt %, and 1.61 wt %, respectively A red color filter containing $SiO_2$ and $ZrO_2$ as main components was obtained from solutions B1 to B6 by the same method as that employed in Example 1. FIG. 2 shows the peak absorption residual rate of ultraviolet rays. As seen from FIG. 2, the color filter had an excellent absorption residual rate. Also, it was found that, when the vitreous component is a mixture of $ZrO_2$ and $SiO_2$, the vitreous component exhibits more excellent light resistance, than the vitreous component made solely of $SiO_2$. As the ratio of $ZrO_2/SiO_2$ increases, the absorption residual rate increases. The absorption residual rate is saturated when the ratio of $ZrO_2/SiO_2$ reaches 1 or thereabouts. It is desirable that the ratio of $ZrO_2/SiO_2$ be 0 to 1, since the surface reflectivity may increase when the ratio of $ZrO_2/SiO_2$ exceeds 1.

EXAMPLE 3

Solution C having the following composition was prepared, and a red color filter was obtained by the same process as in Example 1. The peak absorption residual rate was excellent, i.e., 75%.

| | |
|---|---|
| $Si(OC_2H_5)_4$ | 0.15 wt % |
| hydrochloric acid | 1 wt % |
| water | 6 wt % |
| rhodamine B | 0.2 wt % |
| $Ni(No_3)_2 \cdot 6H_2O$ | 0.2 wt % |
| isopropyl alcohol | balance |

EXAMPLE 4

Solution C having the following composition was prepared, and a blue color filter was obtained by the same process as in Example 1. The peak absorption residual rate was excellent, i.e., 75%.

| | |
|---|---|
| $Si(OC_2H_5)_4$ | 0.15 wt % |
| hydrochloric acid | 1 wt % |
| water | 6 wt % |
| Kayaset Blue-K-FL | 0.2 wt % |
| $Ni(NO_3)_2 \cdot 6H_2O$ | 0.2 wt % |
| isopropyl alcohol | balance |

EXAMPLE 5

Figure 3:
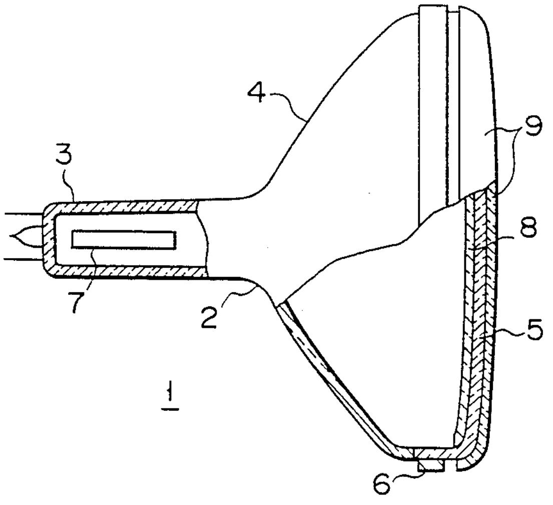
FIG. 3 is a partially broken cross section of a cathode-ray tube according to Example 5 of the present invention.

FIG. 3 shows a cathode-ray tube according to an embodiment of the present invention.

Cathode-ray tube 1 has hermetically sealed glass envelope 2 from which the air is evacuated. Envelope 2 has neck 3 and cone 4 continuous with neck 3, as well as faceplate 5 closely attached on cone 4 by means of an adhesive of frit glass. Metallic tension band 6 is wound around the peripheral side wall of faceplate 5 to prevent cathode-ray tube 1 from explosion. Electron gun 7 for emitting electron beams is arranged within neck 3. The inner surface of faceplate 5 is provided with a phosphor screen including phosphor stripes, which emit red, green and blue light upon excitation by the electron beams, and light-absorbing black stripes arranged one between each pair of phosphor stripes. A shadow mask (not shown) having holes formed over its entire surface area is arranged near the phosphor screen. A deflecting system (not shown) for deflecting the electron beams to scan phosphor screen 8 is arranged on the outside of cone 4.

The outer surface of faceplate 5 of cathode-ray tube 1 is coated with color filter 9. Color filter 9 is made of a vitreous material including at least one kind of organic compound having visible light absorbing properties, and at least one metal compound selected from the group consisting of a Ni compound and a Co compound. Color filter 9 was made in the following manner. Solution A8 employed in Example 1 was prepared. The solution A8 was applied by a spin coat over the front surface of the faceplate of a finished 25-inch color cathode-ray tube, and then dried at 100° C. for 10 minutes. Thus, color filter 9 was obtained.

The characteristics of the cathode-ray tube were examined, and it was found that the contrast of image was remarkably improved and the light resistance of the color filter was very high.

What is claimed is:

1. A color filter comprising a vitreous material including at least one kind of organic compound having visible light absorbing properties, and at least one metallic compound selected from the group consisting of a Ni compound and a Co compound.

2. The color filter according to claim 1, wherein said vitreous material is coated on an inorganic substrate by an alcoholate method.

3. The color filter according to claim 1, wherein said vitreous material contains $SiO_2$ as a main component.

4. The color filter according to claim 1, wherein the weight ratio of the added metallic compound to the organic compound is 0.05 to 10.

5. The color filter according to claim 1, wherein the weight ratio of the added metallic compound to the organic compound is 0.2 to 6.

6. The color filter according to claim 1, wherein said Ni compound is at least one compound selected from the group consisting of $Ni(NO_3)_2.6H_2O$, $NiCl_2.6H_2O$, $NiF_2$, $NiBr_2$, $NiI_2$, $NiSO_4$, $Ni(CH_3COO)_2.4H_2O$, nickel-bis(octylphenyl)sulfide, [2,2'-thiobis(4-t-octylphenolate)]-n-butylaminnickel, nickel complex-3, 5-di-t-butyl-4-hydroxybenzylphosphormonoethylate, nickel-dibutyldithionacarbamate, and bis(dithiobenzyl)nickel complex.

7. The color filter according to claim 1, wherein said Co compound is at least one compound selected from the group consisting of $CoCl_2$, $CoF_2$, $CoBR_2$, $CoI_2$, $CoSO_4$, $Co(CH_3COO)_2.4H_2O$ and $Co(NO_3)_2.6H_2O$.

8. A cathode-ray tube comprising a vacuum envelope having a faceplate, the inner surface of which is provided with a phosphor screen, and a color filter formed on the outer surface of said faceplate and comprising a vitreous material including at least one kind of organic compound having visible light absorbing properties, and at least one metallic compound selected from the group consisting of a Ni compound and a Co compound.

9. The cathode-ray tube according to claim 8, wherein said vitreous material is formed by an alcoholate method.

10. The cathode-ray tube according to claim 8, wherein said vitreous material contains $SiO_2$ as a main component.

11. The cathode-ray tube according to claim 8, wherein said vitreous material contains $TiO_2$ as a main component.

12. The cathode-ray tube according to claim 8, wherein said vitreous material contains $ZrO_2$ as a main component.

13. The cathode-ray tube according to claim 8, wherein said vitreous material contains $SiO_2$ and $TiO_2$ as a main component.

14. The cathode-ray tube according to claim 8, wherein said vitreous material contains $SiO_2$ and $ZrO_2$ as a main component.

15. The cathode-ray tube according to claim 8, wherein the weight ratio of the added metallic compound to the organic compound is 0.005 to 10.

16. The cathode-ray tube according to claim 8, wherein the weight ratio of the added metallic compound to the organic compound is 0.2 to 6.

17. The cathode-ray tube according to claim 8, wherein said Ni compound is at least one compound selected from the group consisting of $Ni(NO_3)_2.6H_2O$, $NiCl_2.6H_2O$, $NiF_2$, $NiBr_2$, $NiSO_4$, $Ni(CH_3COO)_2.4H_2O$, nickelbis(octylphenyl)sulfide, [2,2'-thiobis(4-t-octylphenolate)]-n-butylaminnickel, nickel complex-3, 5-di-t-butyl-4-hydroxybenzylphosphormonoethylate, nickeldibutyldithionacarbamate, and bis(dithiobenzyl)-nickel complex.

18. The cathode-ray tube according to claim 8, wherein said Co compound is at least one compound selected from the group consisting of $CoCl_2$, $CoF_2$, $CoBR_2$, $CoI_2$, $CoSO_4$, $Co(CH_3COO)_2.4H_2O$, and $Co(NO_3)_2.6H_2O$.

* * * * *